May 14, 1957
L. E. WOOD
2,792,481
CONDITION-SENSING CABLE AND METHOD OF
MOUNTING SENSING ELEMENTS THEREIN
Filed May 5, 1955
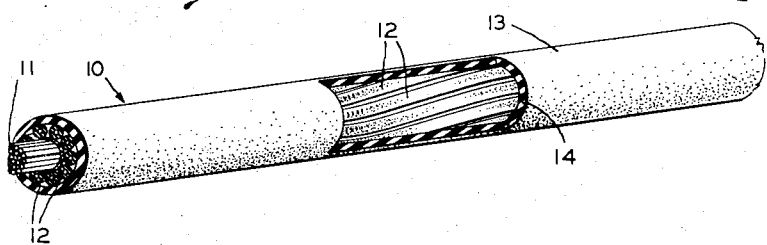
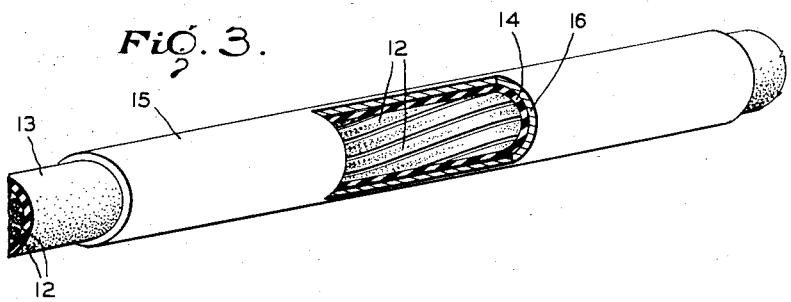
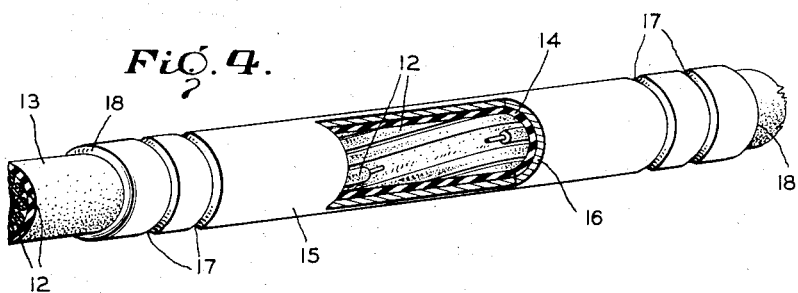
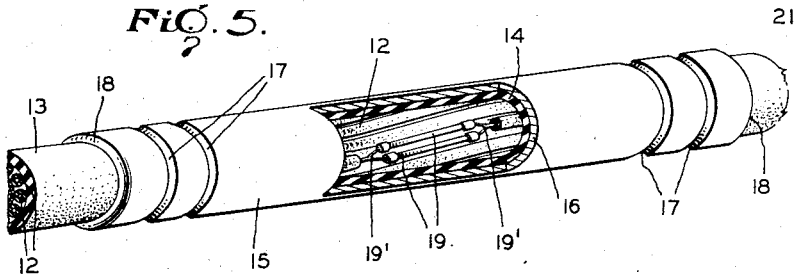
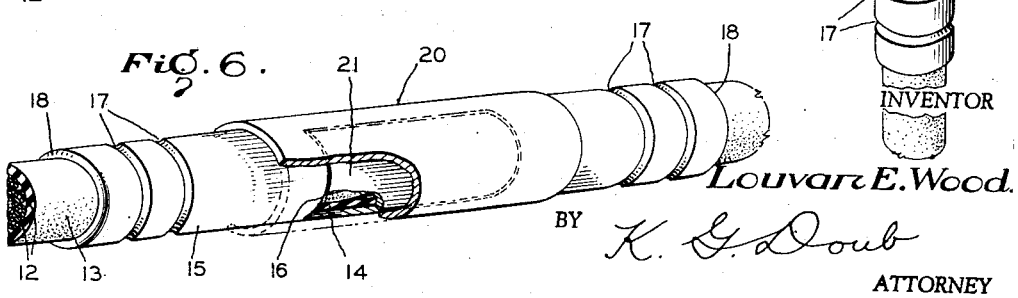
INVENTOR
Louvan E. Wood.
BY K. G. Doub
ATTORNEY

United States Patent Office 2,792,481
Patented May 14, 1957

2,792,481

CONDITION-SENSING CABLE AND METHOD OF MOUNTING SENSING ELEMENTS THEREIN

Louvan E. Wood, Glen Arm, Md., assignor to Bendix Aviation Corporation, Baltimore, Md., a corporation of Delaware Application May 5, 1955, Serial No. 506,314

6 Claims. (Cl. 201—63)

In certain types of installations, for example grain elevators, it is desirable to sense the temperature or other condition existing at different levels along the length or depth of a shaft or other elongated chamber in which perishable material may be stored. A convenient method of doing this is to utilize a cable made up of a plurality of individual conductors insulated from one another and forming part of an electric indicator circuit or circuits, and interposing in said conductors suitable condition-responsive probes or resistance elements, as occasion may require. Where such elements are relatively rugged and capable of withstanding flexing and torsional stress and strain, the problem is relatively simple, but in the case of sensing elements of a relatively delicate nature, for example ceramic resistors (commonly known as thermistors) having a thin elongated contour, the problem becomes more complex, since any slight flexing or strain on the cable may break the thermistor or the terminals which connect the opposite ends of the thermistor in the indicator circuit.

The primary object of the present invention, therefore, is to provide an electric cable incorporating condition-sensing elements in a manner such as to render the elements secure against breakage or damage due to stresses and strains to which the cable may be subjected during installation, servicing and use of the equipment. Another object is to provide a method of mounting thermistors and like elements in cables in a manner such as to not only reduce the chances of incapacitation of the element or its electrical connections but which will facilitate servicing of the cable in the event of damage to the elements or in case of substitution of elements having different values of resistance.

The foregoing and other objects and advantages will become apparent in view of the following description taken in conjunction with the drawings, wherein:

Figure 1 is a view in perspective of a length of cable in accordance with the invention; and Figures 2 to 6, inclusive, are fragmentary perspective views of portions of the cable of Figure 1, showing in successive steps a preferred method of mounting sensing elements in the cable.

The cable illustrated herein and generally indicated at 10, comprises a steel strengthening and stiffening core 11, made up of a series of wire strands, said core being surrounded by a plurality of individually insulated conductors 12, the latter in turn being confined by a jacket or sheath 13 of insulating material, such as rubber or synthetic rubber but which may be of any material found suitable for the purpose. The conductors 12 are usually interposed in or form part of a suitable electric indicator and/or recorder circuit, not shown, for the purpose of providing a visual indication of the condition, in this case temperature, at various levels of the elevator shaft, there being a separate conductor for each particular level where the temperature is to be sensed.

A preferred method of installing sensing elements in the respective conductors 12 is illustrated in Figures 2 to 6, inclusive. The first step is to cut an opening or window 14 in the outer insulation jacket 13 as shown in Fig. 2, the opening or window in this instance being of rectangular form.

The next step, Fig. 3, is to insert a sleeve 15 over the cable having a window 16 in registration with the window 14. This sleeve is preferably made of rigid but deformable material, such as steel.

Figure 4 illustrates the next step, which consists in rolling or deforming the metal of the sleeve at opposite extremities thereof to cause it to bite into or grip the jacket 13 and be retained in place thereon. In practice, the sleeve has rolled thereinto a series of grooves or depressions 17, the opposite ends of the sleeve also being peened radially inwardly as at 18.

The particular conductor 12 in which the thermistor 19 or other temperature-sensing element is to be inserted has a suitable length thereof cut out and one or more thermistors inserted in the cut-out portion with the thermistor terminals 19' connected as by soldering or otherwise to the adjacent cut ends of the conductor, as shown in Fig. 5. Any number of thermistors may be utilized in series or in parallel, depending upon requirements.

Finally, a cover 20, conformed to the contour of the sleeve, may be applied over the window 16, said cover being removable to facilitate servicing, as in case it becomes necessary to replace a thermistor or to repair a terminal connection. The type of cover shown herein is of the snap-on type, made of resilient sheet metal and provided with a gripping boss 21 on its inner surface, which registers with the window 16 of the sleeve and resists displacement of the cover. Obviously, the cover is optional, since in certain installations it may not be required or even desirable.

A condition-sensing cable constructed in accordance with the present invention is practically fool-proof as far as breakage of the sensing elements is concerned, and hence it may be handled in the normal manner during installation, use and removal for servicing. If the grooves or analogous indentations 17, 18 are made of the proper depth, the thermistor section is protected against axial stretching and strains as well as torsional stresses which are inherently present due to the length and weight of the cable. The sensing elements or thermistors being conveniently accessible, further simplifies the servicing problem.

Although only a preferred embodiment of the invention has been illustrated and described in detail, it will be obvious that limited changes in structure and design are contemplated within the spirit and scope of the invention as defined by the appended claims.

What is claimed and desired to be secured by United States Letters Patent is:

1. In a condition-sensing cable, one or more conductors, an insulating jacket or sheath encircling said conductors, said jacket having an opening therein exposing a length of at least one of said conductors, a condition-sensing element inserted in said length of conductor, and a rigid sleeve telescoped over said opening and adjacent portion of said cable, said sleeve having the opposite extremities thereof deformed into tight clamping engagement with said jacket and conductors to thereby prevent axial and torsional stresses from being transmitted to the section of the cable in which said element is installed.

2. In a condition-sensing cable, one or more insulated conductors, an insulating jacket or sheath encircling said conductors, said jacket having an opening therein exposing a relatively short length of at least one of said conductors, one or more sensing elements electrically connected into said length, a rigid sleeve of deformable ma- 'erial such as sheet steel telescoped over said cable and jacketing said exposed area and the adjacent portions of the cable, the opposite extremities of said sleeve being deformed radially-inwardly into tight engagement with said jacket and conductors to thereby prevent torsional and axial stresses from being transmitted to that portion of the cable incorporating said condition-sensing elements.

3. In a condition-sensing cable, a central axially-extending strengthening and stiffening core surrounded by a plurality of insulated conductors and said conductors in turn being surrounded by a resilient insulating jacket or sheath, said sheath having an opening formed therein exposing at least one of said conductors, a condition-sensing element such as a thermistor connected in a cut-out length of said exposed conductor, a sleeve telescoped over said cable and covering said opening and a substantial portion of the cable beyond opposite ends of said opening, said sleeve having an access window or opening in registration with the opening of said sleeve, said sleeve being comprised of rigid deformable material such as cold rolled steel and having a plurality of grooves formed in the opposite extremities thereof, the metal displaced radially inwardly due to formation of said grooves biting into said insulating jacket and preventing axial and torsional stresses from being transmitted to that portion of the cable incorporating said condition-sensing element.

4. A cable as claimed in claim 3 having a removable cover for the window opening of said sleeve.

5. The method of installing condition-sensing elements such as thermistors in a cable having a plurality of conductors extending axially thereof and encircled by a jacket or sheath of insulating material, which consists in cutting an access opening in said jacket to expose one or more of said conductors, sliding a rigid sleeve over said opening and deforming the opposite extremities of the sleeve into tight engagement with said jacket and connecting one or more thermistors in a cut-out length of at least one of said exposed conductors.

6. The method of installing resistance elements such as thermistors in a cable having a plurality of insulated conductors extending throughout the length thereof and encircled by a jacket or sheath of insulating material, which consists in cutting an access opening in said jacket to expose one or more of said conductors, sliding a sleeve of rigid deformable material such as cold rolled steel onto said cable and over said exposed opening, said sleeve having an opening in registration with the opening in said jacket, rolling a plurality of grooves into opposite extremities of said sleeve to deform the material thereof into tight engagement with the material of said jacket, and connecting one or more thermistors in a cut-out length of said exposed conductor or conductors.

No references cited.